US011392773B1

(12) United States Patent
Gangadharaiah et al.

(10) Patent No.: US 11,392,773 B1
(45) Date of Patent: Jul. 19, 2022

(54) GOAL-ORIENTED CONVERSATIONAL TRAINING DATA GENERATION

(71) Applicant: Amazon Technologies, Inc., Seattle, WA (US)

(72) Inventors: Rashmi Gangadharaiah, San Jose, CA (US); Ajay Mishra, San Jose, CA (US); Roger Scott Jenke, Durham, NC (US); Meghana Puvvadi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 16/264,339

(22) Filed: Jan. 31, 2019

(51) Int. Cl.
*G06F 40/30* (2020.01)
*G06N 20/00* (2019.01)
*G06F 40/211* (2020.01)
*G06F 40/242* (2020.01)

(52) U.S. Cl.
CPC ............ *G06F 40/30* (2020.01); *G06F 40/211* (2020.01); *G06F 40/242* (2020.01); *G06N 20/00* (2019.01)

(58) Field of Classification Search
CPC ........ G06N 20/00; G06N 5/022; G06N 3/006; G06N 3/02; G06N 3/0427; G06N 3/0445; G06N 3/08; G06N 5/04; G06N 5/041; G06N 7/005; G06F 40/30; G06F 40/20; G06F 16/9024; G06F 40/35; G06F 16/3329; G06F 40/289; G06F 40/295; G06F 16/215; G06F 16/285; G06F 16/3344; G06F 16/90332; G06F 16/9535; G06F 40/10; G06F 40/211; G06F 40/40; G06F 40/242; G10L 15/22; G10L 15/08; G10L 15/16; G10L 15/1815; G10L 15/183; H04L 51/02
See application file for complete search history.

(56) References Cited

U.S. PATENT DOCUMENTS

| | | | |
|---|---|---|---|
| 8,214,210 B1* | 7/2012 | Woods | G10L 15/08 |
| | | | 704/236 |
| 10,331,791 B2* | 6/2019 | Anbazhagan | G06N 20/00 |
| 10,387,575 B1* | 8/2019 | Shen | G06F 40/268 |
| 10,417,346 B2* | 9/2019 | Kim | G06F 40/35 |
| 10,460,728 B2* | 10/2019 | Anbazhagan | G06F 9/44505 |
| 2019/0035387 A1* | 1/2019 | Zitouni | G10L 15/1815 |
| 2019/0384813 A1* | 12/2019 | Mahmoud | G10L 15/26 |
| 2020/0073938 A1* | 3/2020 | Losalka | G06F 40/295 |
| 2020/0081939 A1* | 3/2020 | Subramaniam | G06F 16/90332 |
| 2020/0258509 A1* | 8/2020 | Bharadwaj | G10L 15/19 |

* cited by examiner

Primary Examiner — Yogeshkumar Patel
(74) Attorney, Agent, or Firm — Nicholson De Vos Webster & Elliott LLP

(57) ABSTRACT

Techniques for generating conversational training data are described. In some instances, a request to generate conversational training data for a goal-oriented conversation model is received, a transitional graph of intents is traversed to generate a conversation template for each intent of the transitional graph, each intent being a task to fulfill a request and comprising one or more slot to be filled by a user of the bot machine learning model, the conversation template including a path including at least one placeholder for an utterance or a slot level utterance, and at least utterances from one or more dictionaries are sampled to fill in the placeholders for the utterances of the path to generate conversational training data.

20 Claims, 15 Drawing Sheets

GOAL-ORIENTED CONVERSATIONAL TRAINING DATA GENERATION

BACKGROUND

Large domain chatbots are now omnipresent, reaching many people through services. Recent efforts have been more focused towards basic chit-chat that are non-goal oriented. Chit-chat refers to the ability to generate fluent responses that are reasonable in the context of the conversation. In contrast, in task or goal-oriented dialog, the chatbot needs to extract relevant information from the user (e.g., preferences), provide relevant knowledge to the user (e.g., prices and availability), and issue appropriate system calls (e.g., make a payment).

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for generating conversation training data are described.

Advances in training deep neural networks have demonstrated the potential to build chatbots with minimal expert domain knowledge. A few approaches have been proposed that can perform end-to-end learning from expert trajectories or dialogs, removing the need for many of the independent modules in traditional dialog systems such as, for example, the natural language understanding component, the natural language generation component, the dialog policy and the state tracker. The significance or extensibility of such approaches is still unclear on many real-world applications of chatbots. One of the main reasons for this is the lack of real-world dialog datasets. Hence, creation of such datasets is critical for progressing research in dialog systems. Detailed herein are embodiments directed to generating conversation training data using information provided by bot developers.

Figure 1:
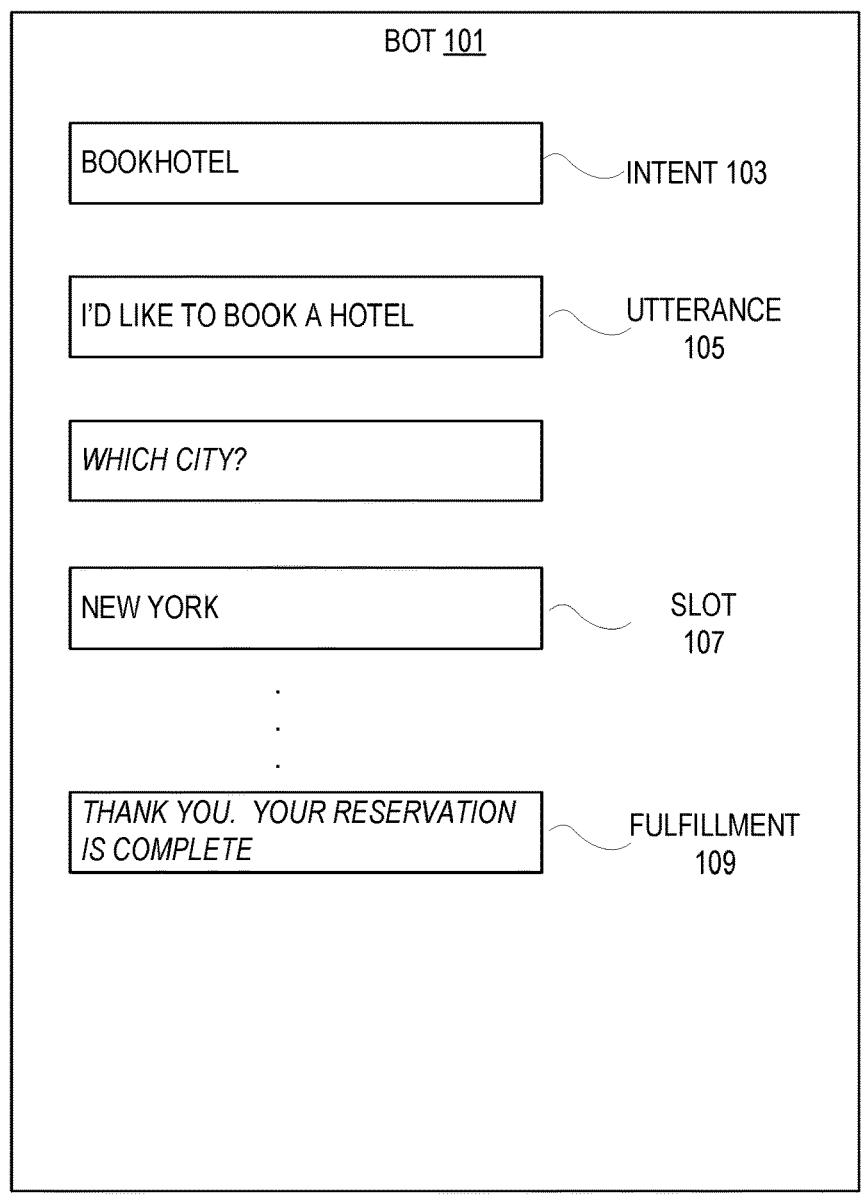
FIG. 1 illustrates an embodiment of a bot usage.

FIG. 1 illustrates an embodiment of a bot usage. In this example, the bot 101 is used to intake user input (such as utterances) and provide responses to the input (shown in italics). In this example, the intent 103 of the bot 101 is to book a hotel. An intent represents an action to take in response to natural language input. In particular, an intent is a task/goal for an agent (such as a chatbot) that is necessary in order to fulfill a user's request. Intents may use (1) custom slot types defined specifically for a domain (e.g., a "book_hotel" slot for a trip planning domain) or (2) built-in slot types that can express intents that are general enough to be applied across many domains (e.g., a "greeting" slot which can be applied to almost any domain). A slot is a list of values used to train a machine learning model to recognize values for a slot (e.g., the value "New York" in this example).

A user provides an utterance 105 in the form of a spoken or typed phrase that invokes the intent 103. Slots 107 are input data required to fulfill an intent. As such, slots 107 represent parameters that have to be asked and assigned values in order to fulfill an intent in a user's request. For example, in order to successfully complete a book_hotel reservation, an agent would require information about multiple slots such as, for example, the "start_date" and the "end_date" (which represent the check-in and check-out dates), the "location_to" (which represents the place where the user is traveling to) and other preferences of the user like "price_range." The list of possible values these slots 107 may be restricted to include (1) custom values (for the example dataset above, "location_to" can be the name of a US city such as, for example, San Jose, Seattle, etc.) or (2) built-in types, such as builtin.date for the slot labeled "start_date" or "end_date."

Finally, the bot 101 provides an indication of fulfillment.

Figure 2:
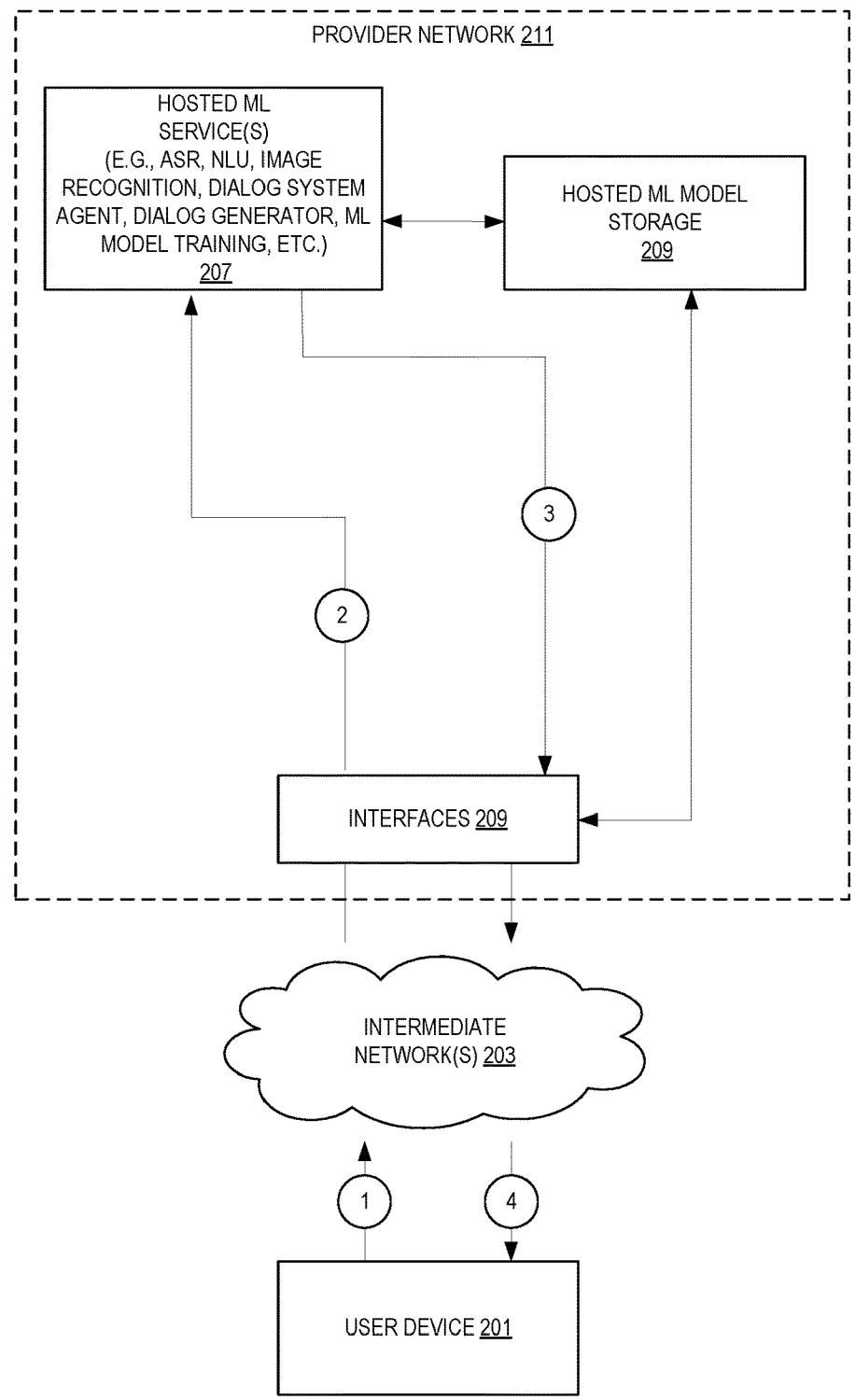
FIG. 2 illustrates embodiments of a system generating training data for a bot, training a bot, and/or hosting a bot including for performing inference for natural language understanding (NLU), image recognition, and/or automatic speech recognition (ASR).

FIG. 2 illustrates embodiments of a system generating training data for a bot, training a bot, and/or hosting a bot or other service including for performing inference for natural language understanding (NLU), image recognition, and/or automatic speech recognition (ASR). As shown, a provider network 211 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. for at least NLU. These and other computing resources may be provided as services, such as a hardware virtualization service that can execute compute instances, a storage service that can store data objects, etc. The users (or "customers") of provider networks 211 may utilize one or more user accounts that are associated with a customer account, though these terms may be used somewhat interchangeably depending upon the context of use. Users devices 201 may interact with a provider network 211 across one or more intermediate networks 203 (e.g., the internet) via one or more interface(s) 209, such as through use of application programming interface (API) calls, via a console implemented as a website or application, etc. The interface(s) 209 may be part of, or serve as a front-end to, a control plane of the provider network 211 that includes "backend" services supporting and enabling the services that may be more directly offered to customers.

To provide these and other computing resource services, provider networks 211 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

In this illustration, the provider network 211 provides several bot related services including, for example, NLU services, ASR services, support for hosting a dialog system agent, dialog training data generation, machine learning (ML) model training (e.g., bot training), etc.

When the application 205 is a bot, the illustrated circles represent actions that may occur. As shown, at circles 1 and 2, a user device 201 communicates with the provider network 211 via intermediate networks 203 and interfaces 209. In particular, the user device 201 communicates with a hosted ML service 207 (such as a bot including a dialog system agent). An example of a communication is an "utterance" to be handled by the bot. The hosted ML service 207 hosts ML models for different entities on a shared fleet of physical and/or virtual hosts. The hosted ML models may be custom (for example, user provided) or provided by the service. The bot may call other hosted ML services 207 such as the ASR and NLU services in response to received utterances, etc. Hosted ML model storage 209 stores models for NLU services, ASR services, support for hosting a dialog system agent, dialog training data generation, and ML model training.

The results of the bot are returned at circle 3 and then forwarded back to the user device 201 as needed in circle 4.

When training data for the application is to be generated, these same illustrated circles represent actions that may occur for that process. As shown, at circles 1 and 2, a user device 201 communicates with the provider network 211 via intermediate networks 203 and interfaces 209. In particular, the user device 201 communicates with a dialog generator (and in some instances, a bot trainer) which is a hosted ML service 207. The user provides a request to generate training data for a bot. This request, as detailed herein, may contain one or more of: a bot definition, a location of a bot definition, exemplary utterances and/or slot values, one or more locations of exemplary utterances and/or slot values, a location to store generated training data, a location to store a trained bot, etc.

The dialog generator (a hosted ML service 207) generates the training data and, if requested with either the initial request or a separate request, provides this data to a bot trainer.

The results of the bot are returned at circle 3 and then forwarded back to the user device 201 as needed in circle 4.

Figure 3:
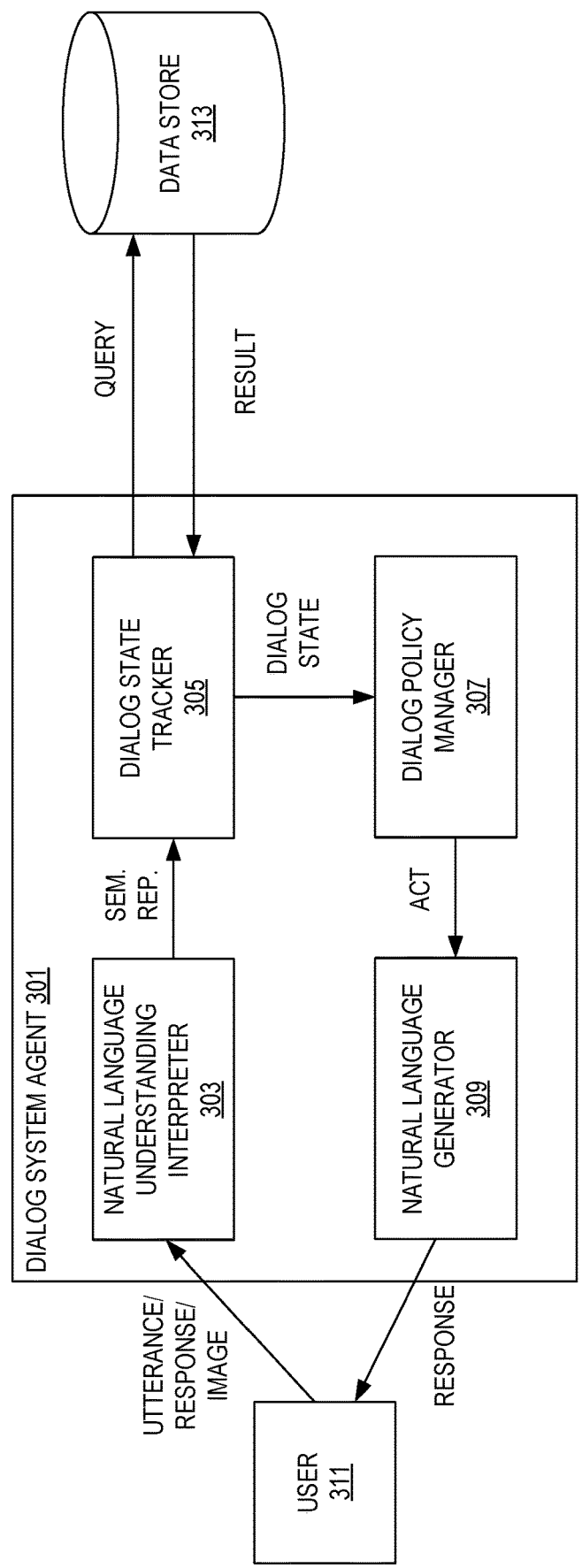
FIG. 3 illustrates embodiments of a dialog system agent such as a chatbot.

FIG. 3 illustrates embodiments of a dialog system agent such as a chatbot. The dialog system agent 301 is typically a collection of software components stored in memory and executed by one or more processors. In some embodiments, one or more of the components are models and/or are a part of a larger model (such a rule based or machine learning).

As illustrated, the dialog system agent 301 includes many individual components, each responsible for performing a specific sub-task. A Natural Language Understanding (NLU) interpreter 303 maps a user's 311 utterance, provided image, or response text into a semantic representation. A Dialog State Tracker (DST) 305 updates its belief of the state of the system based on a history of the dialog (based on queries and results from the data store 313) and the semantic representation. A Dialog Policy Manager (DPM) 307 predicts the next action given the output of the DST 305. A Natural Language Generator (NLG) 309 converts the predicted action into text. In some instances, these components are typically trained independent of each other which may result in sub-optimal performance. However, in embodiments detailed herein, these components of the dialog system agent 301 are trained, end-to-end, together.

Figure 4:
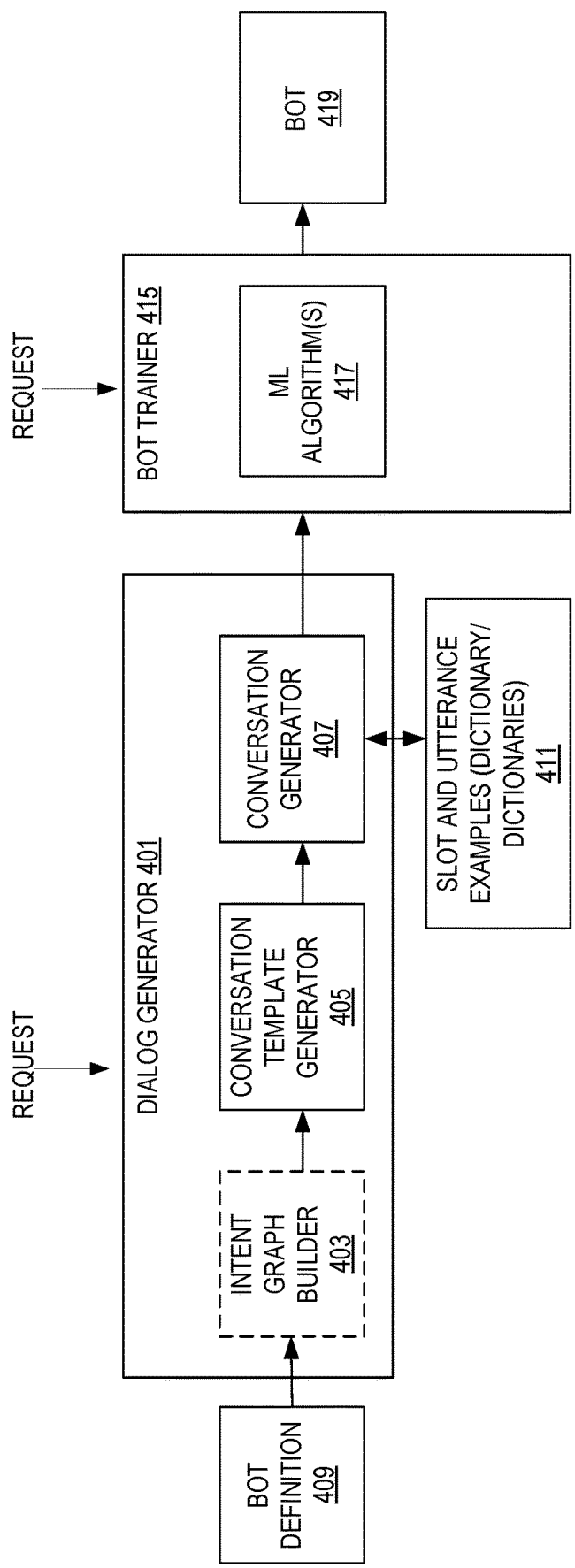
FIG. 4 illustrates embodiments of a dialog generator.

FIG. 4 illustrates embodiments of a dialog generator. The dialog generator 401 utilizes one or more components to generate dialog training data 413 and this dialog training data may be utilized to train one or more dialog system agents such as dialog system agent 301. In some embodiments, the components of the dialog generator 401 are software components stored in memory and executed in hardware. The dialog generator 401 typically operates in response to a received request that may include such information as a location of a bot definition (or include the bot definition), a location of one or more dictionaries to use, and the request may be a request to generate training data for a given bot or to generate training data and train a given bot, etc.

In some embodiments, one or more of the dialog generator 401 and bot trainer 415 are provided as one or more services of a provider network and/or the dictionaries 411 are stored in storage of a provider network (such as that detailed above). In some embodiments, one or more of the dialog generator 401, dictionaries 411, and bot trainer 415 are implemented on a local device or by one or more non-provider network servers. In some embodiments, the dictionaries 411 include a bot definition.

In some embodiments, the dialog generator 401 includes an intent graph builder 403. The intent graph builder 403 takes a bot definition 409 and generates a graph of intents (or "intent graph") wherein each path from a source to a sink indicates a possible intent trajectory including interactions between the bot and a user (such as slots to fill, utterances, prompts, etc.). A bot definition defines slots and/or intents. In some embodiments, a bot definition is a JavaScript Object Notation (JSON) file. In some embodiments, paraphrases are generated and/or inserted by the intent graph builder 403.

Figure 5:
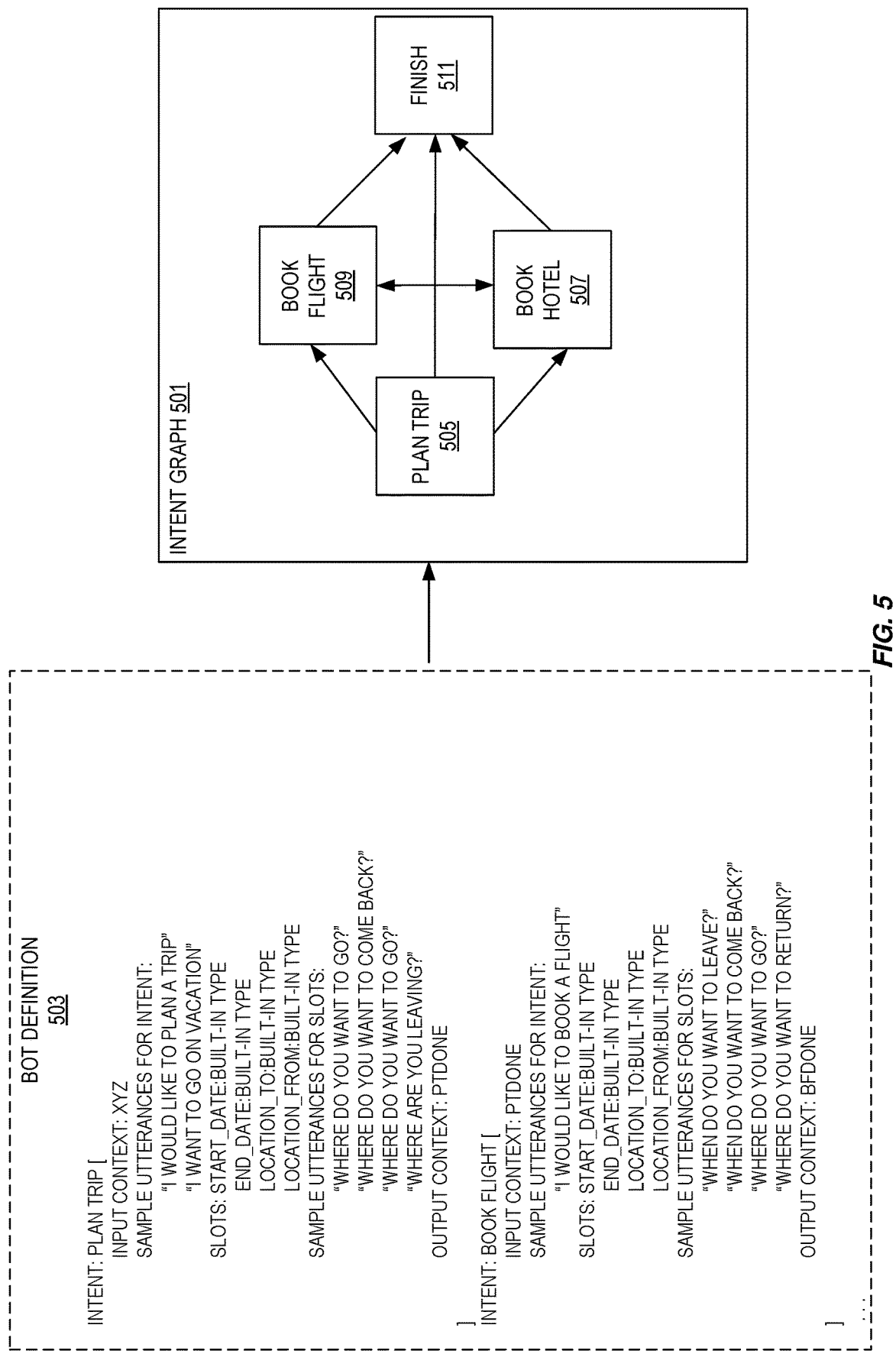
FIG. 5 illustrates an embodiment of an intent graph and a part of a bot definition.

FIG. 5 illustrates an embodiment of an intent graph and a part of an exemplary bot definition. As shown, a bot definition 503 is used as the basis of the intent graph 501. The bot definition 503 includes a plurality of intents (only two are shown) with each intent including one or more slots to fill in and their types, examples of slot prompts, and examples of utterances that signal the intent.

Each intent (shown here as plan trip 505, book flight 509, and book hotel 507) and their relationships are described as nodes in the intent graph. In this example, the initial intent (plan trip 505) is the first intent to be addressed with the bot followed by either the bot finishing (node 511) or one or book flight 509 or book hotel 507 being addressed. The book flight intent is a conditional intent requiring the plan trip intent to be complete as noted by context value PTDONE.

The graph of intents is consumed by a conversation template generator 405 which traverses the intent graph to generate a conversation template for each intent of the intent graph. A conversation template is a path through the graph. In some embodiments, the intent is traversed in a depth-first manner Parameters dictating the actions of the conversation template generator 405 such as, for example, intents to consider, a number of conversations to generate, a number of unique paths to generate, and transition probabilities, are provided in a request. This request may be a request to generate training data for a given bot or to generate training data and train a given bot.

Figure 6:
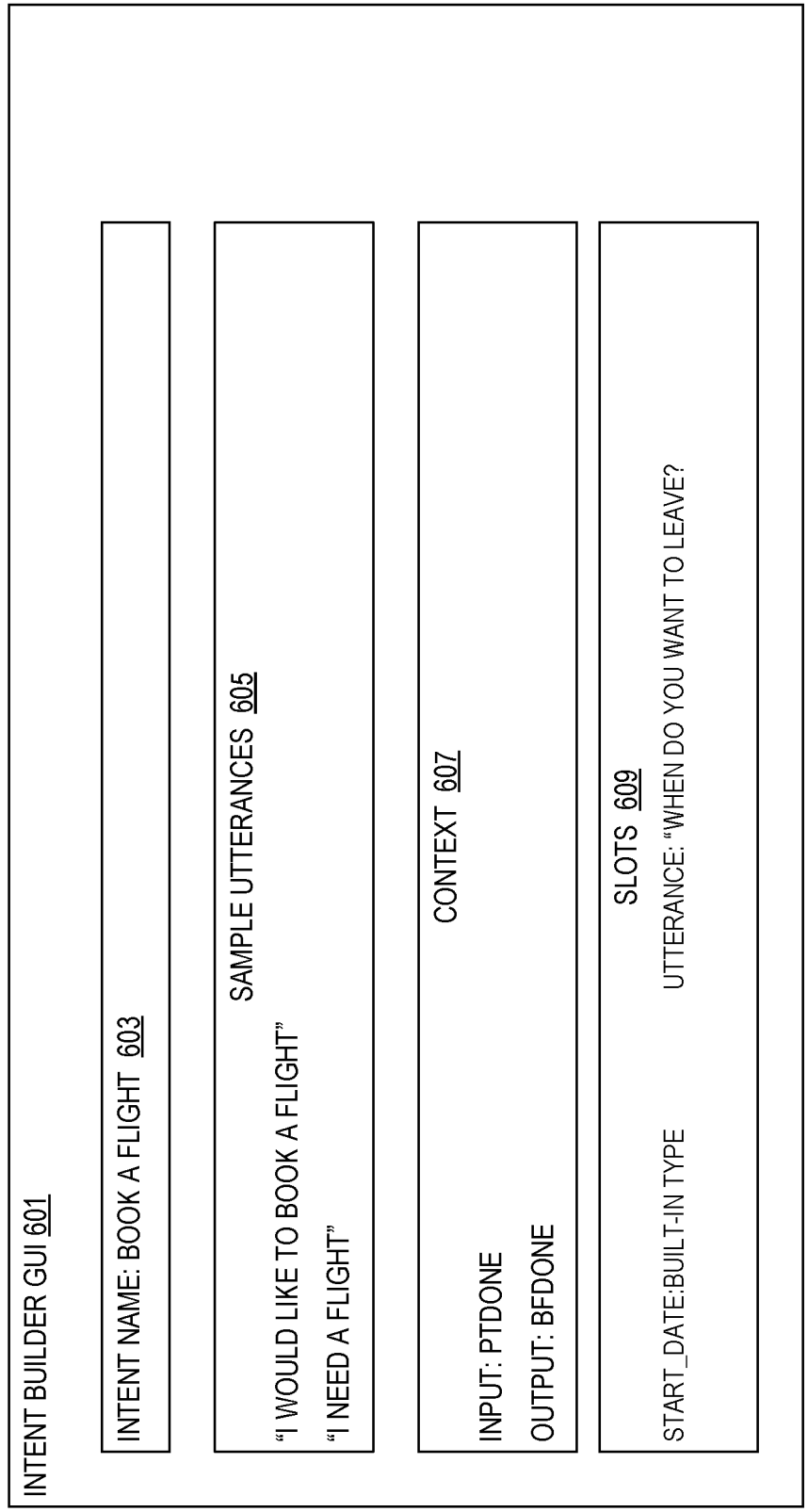
FIG. 6 illustrates an example of a portion of a conversation template.

Note, in some embodiments, an intent graph is built through a graphical user interface (GUI). FIG. 6 illustrates embodiments of an intent builder GUI. This GUI 601 includes multiple places for user input including a field to input an intent name 603, a field to input one or more sample utterances 605 (or in some embodiments, to select a pre-defined sample utterance), a field to input context information 607 (input context and output context to be used to transition from one intent to another), and/or a field for defining slots and sample utterances for those slots 609.

Figure 7:
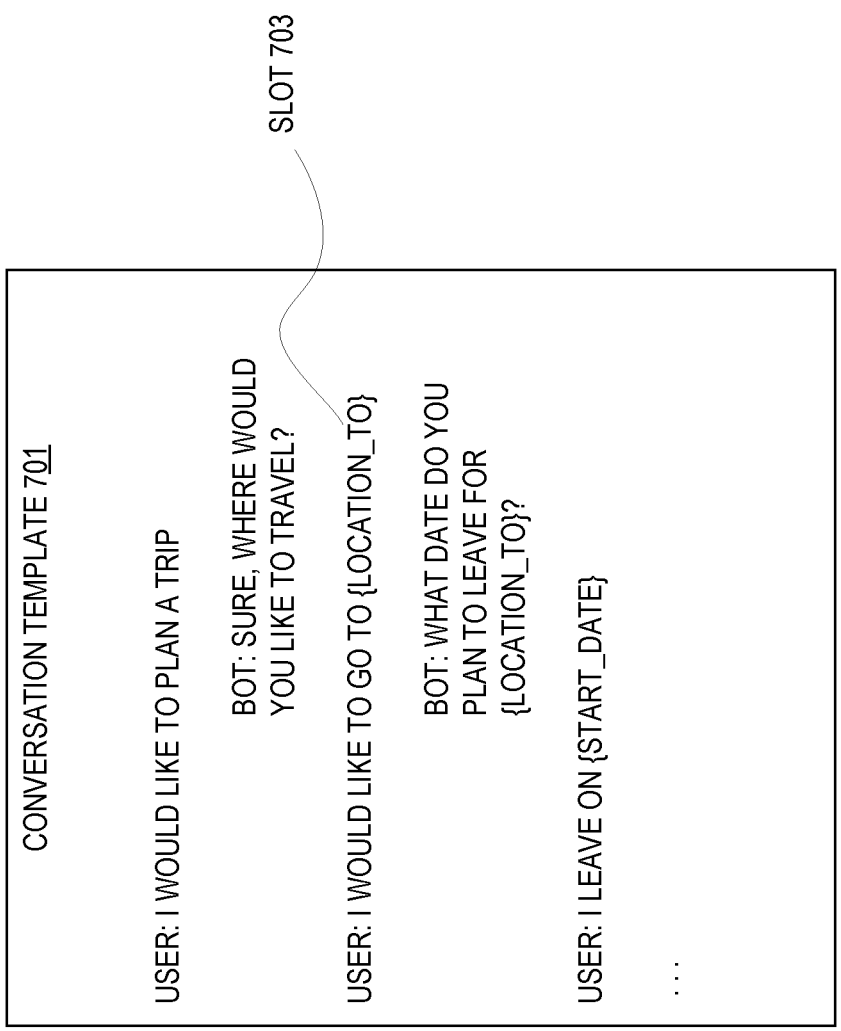
FIG. 7 illustrates an example of an embodiment of conversation training data

FIG. 7 illustrates an example of a portion of a conversation template. A conversation template 701 includes prompts from the bot and a user and includes places for a slot (such as slot 703) to be filled. In this example of a portion of conversation template 701, the intent is to plan a trip and the slots are delineated by { }.

A conversation generator 407 takes in the conversation template(s) and samples slots and utterances from one or more dictionaries 411 to generate one or more conversations as conversation training data. The one or more dictionaries 411 are typically external to the dialog generator 401 but, in some embodiments, are a part of the dialog generator 401. In some embodiments, paraphrases are generated and/or inserted by the conversation generator 407.

Figure 8:
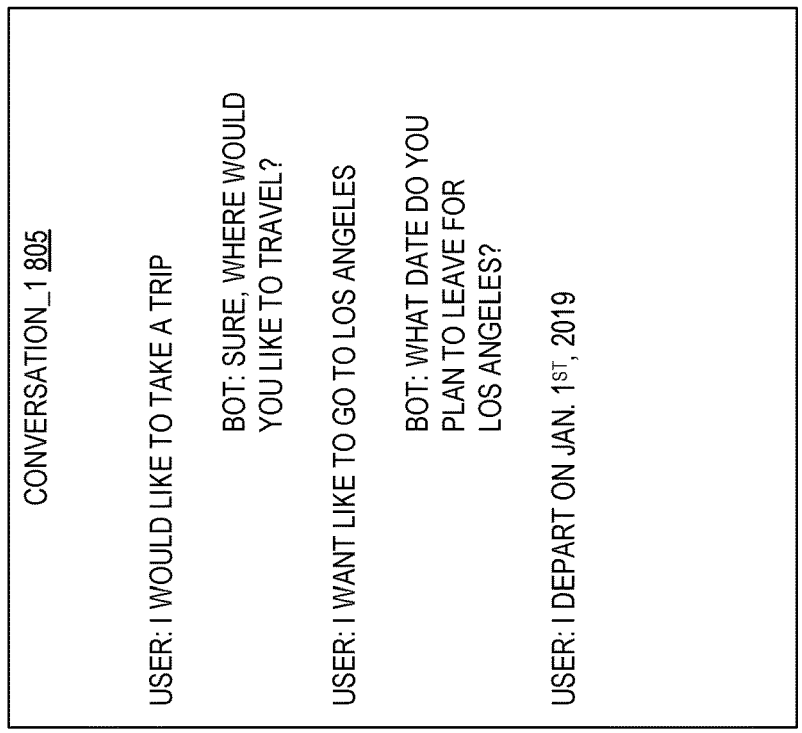
FIG. 8 illustrates embodiments of a method for generating conversational training data.
Figure 8:
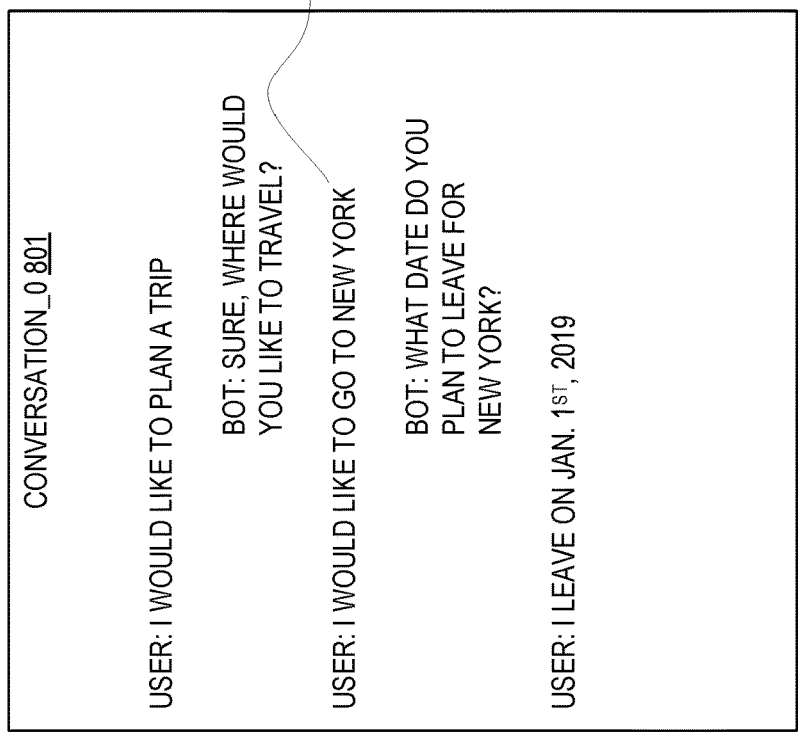

FIG. 8 illustrates an example of an embodiment of conversation training data. In this example, a conversation 801 is generated based upon the conversation template of FIG. 7. As shown, the slots (including slot 803) are filled in.

A second conversation 805 includes paraphrases that have been added as substitutions for some of the sample utterances.

Referring again to FIG. 4, bot trainer 415 may then be utilized to train one or more machine learning algorithms 417 that are a part of the bot to be trained. This training utilizes the generated conversation training data to generate a bot 419. The bot 419 may be activated by a request separate from the request to generate conversation training data, or in response to the request to generate conversation training data.

Figure 9:
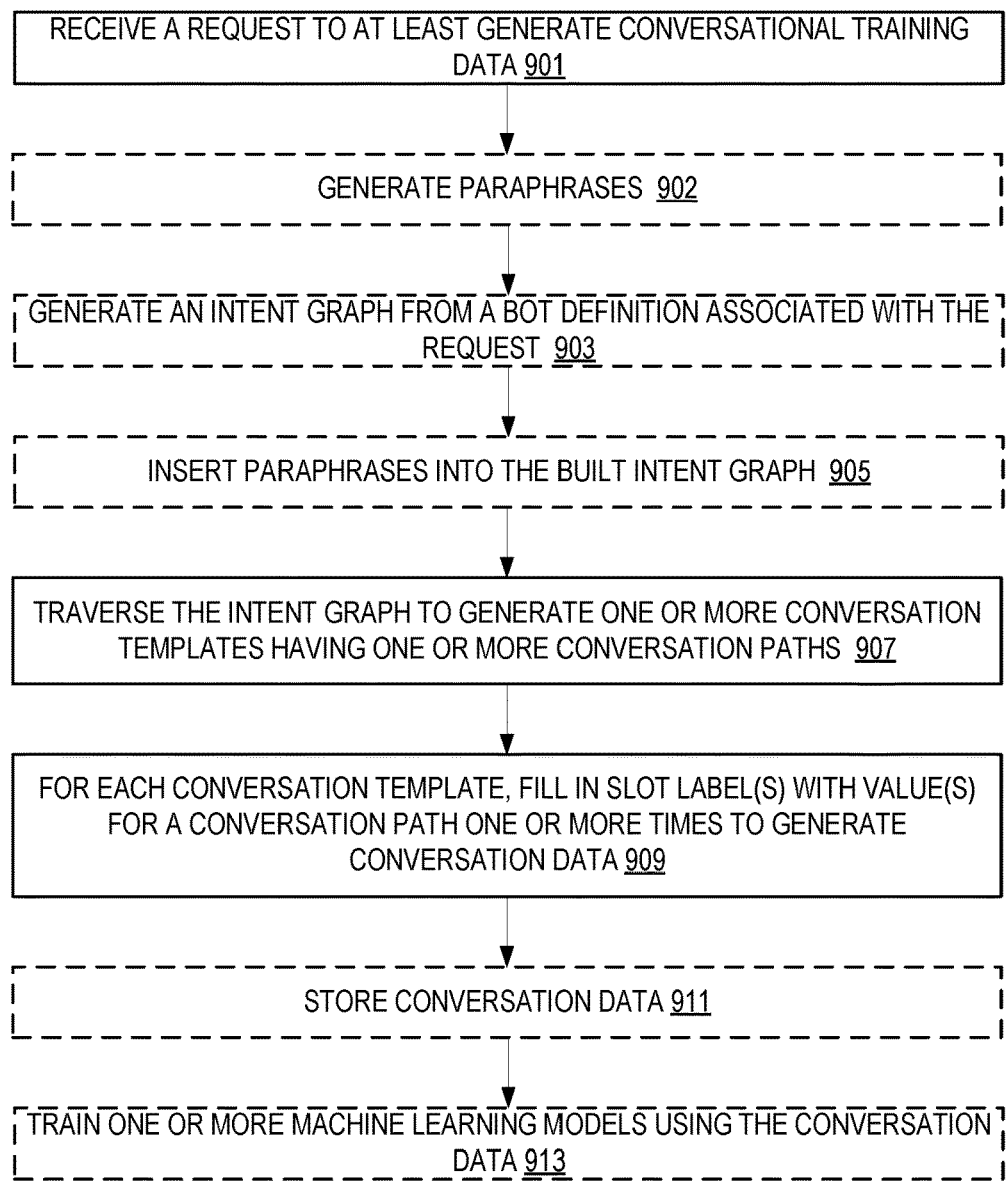
FIG. 9 illustrates an example provider network environment according to some embodiments.

FIG. 9 illustrates embodiments of a method for generating conversational training data. The generated conversational training data may be used to train a bot which may include a dialog system agent 301. In some embodiments, a dialog generator such as dialog generator 401 and/or a bot trainer (such as bot trainer 415) perform aspects of this method.

At 901, a request to generate conversational training data for a goal-oriented conversation model (such as a rule-based or machine learning model) is received. For example, the request may include one or more of a bot definition, a location of a bot definition, exemplary utterances and/or slot values (if not a part of the bot definition), one or more locations of exemplary utterances and/or slot values (if not a part of the bot definition), a location to store generated training data, etc. In some embodiments, the request also includes a command to train the bot machine learning model using the conversational training data.

In some embodiments, paraphrases are generated at 902. In some embodiments, these paraphrases are generated based on utterances of a bot definition or as input in a GUI. An utterance phrase does not need to be a linguistic phrase, but can simply be a phrase containing one or more words. In some embodiments, to generate paraphrases, repositories, such as wordnet, are called to get synonymous replacements for phrases in a sentence. Once relevant synonyms have been retrieved, a language model is used to evaluate the syntactic sense of sentence and filter out the sentences with phrases having higher perplexity scores. This language model may be built with a large domain-specific corpus or a general-purpose corpus of sentences such as Wikipedia. Typically, the language model contains n-gram probabilities and these scores are helpful in determining grammatical correctness of newly generated sentences (using paraphrases) as well as indicate how well these sentences belong in the domain. This way even if the bot definition contains fewer number of utterances the data may be increased by having paraphrases added to the original utterances.

In some embodiments, a transitional graph of intents from a definition of the bot machine learning model associated with the request is generated at 903. In an embodiment, each intent of the graph is a task necessary to fulfill a request and comprises one or more slot to be filled by a user of the bot machine learning model. In some embodiments, the transitional graph of intents is generated, at least partially, from a bot definition. In some embodiments, the graph of intents is generated from user input to a GUI.

In some embodiments, paraphrases are inserted into the transitional graph of intents at 905. These paraphrases are variations of sample utterances and/or prompts of the bot definition used to generate the transitional graph of intents.

The transitional graph of intents is traversed at 907 to generate a conversation template for each intent of the transitional graph, the conversation template including one or more paths including at least one placeholder for an utterance and a slot. In some embodiments, this traversal is performed in a depth-first manner.

In some embodiments, the traversal includes adding a start and end node to the transitional graph of intents and two kinds of edges: (1) from the start node to the root node (node with in-degree zero) and (2) from the leaf nodes to the end node. A sampling of simple paths, such paths in which no node is repeated twice, between the start and end node is then made.

An iteration through all the paths is then performed, while making local edits to replace nodes that have choices with the possible candidates thus removing the old high-level path and introducing two (or the number of possible choices)

paths in place of it. The iteration stops when all choice nodes have been broken down into actual low-level states.

All the paths are expanded further to have different permutations for asking about slots. For example, one can ask about the start_date first and then the location_to or vice versa when talking about the plan_trip intent. Since there might be redundant states while doing so (e.g., a request about location_to under the sub-intent book hotel when the slot value has already been queried before), redundant NLU state flows are pruned.

Further, business logic may prevent (or enforce) certain conversation paths. For example, in the trip planning domain, a customer who has said "no" when asked if they want to book_flight should not be asked if they want to book_cab to the airport and these paths are also pruned in some embodiments according to such logic.

At 909, for each conversation template, slot values and utterances are sampled (filled in) from one or more dictionaries to fill in the placeholders for the utterances and slots of the one or more paths to generate conversational training data. Additionally, in some embodiments, paraphrases are introduced here to substitute, for example, utterances. In some embodiments, the slot values and utterances are sampled at random. In other embodiments, the slot values and utterances utilize a biasing mechanism of which intent paths are more likely. This biasing can be learned from the training data or provided by a bot developer.

In some embodiments, the generated conversational training data is stored, as directed by the request, at 911.

In some embodiments, a bot machine learning model is trained using the generated conversational training data at 913. In some embodiments, this training comprises end-to-end training of a natural language understanding component, a dialog state tracker component, a dialog policy manager component, and a natural language generator of the bot machine learning model.

Figure 10:
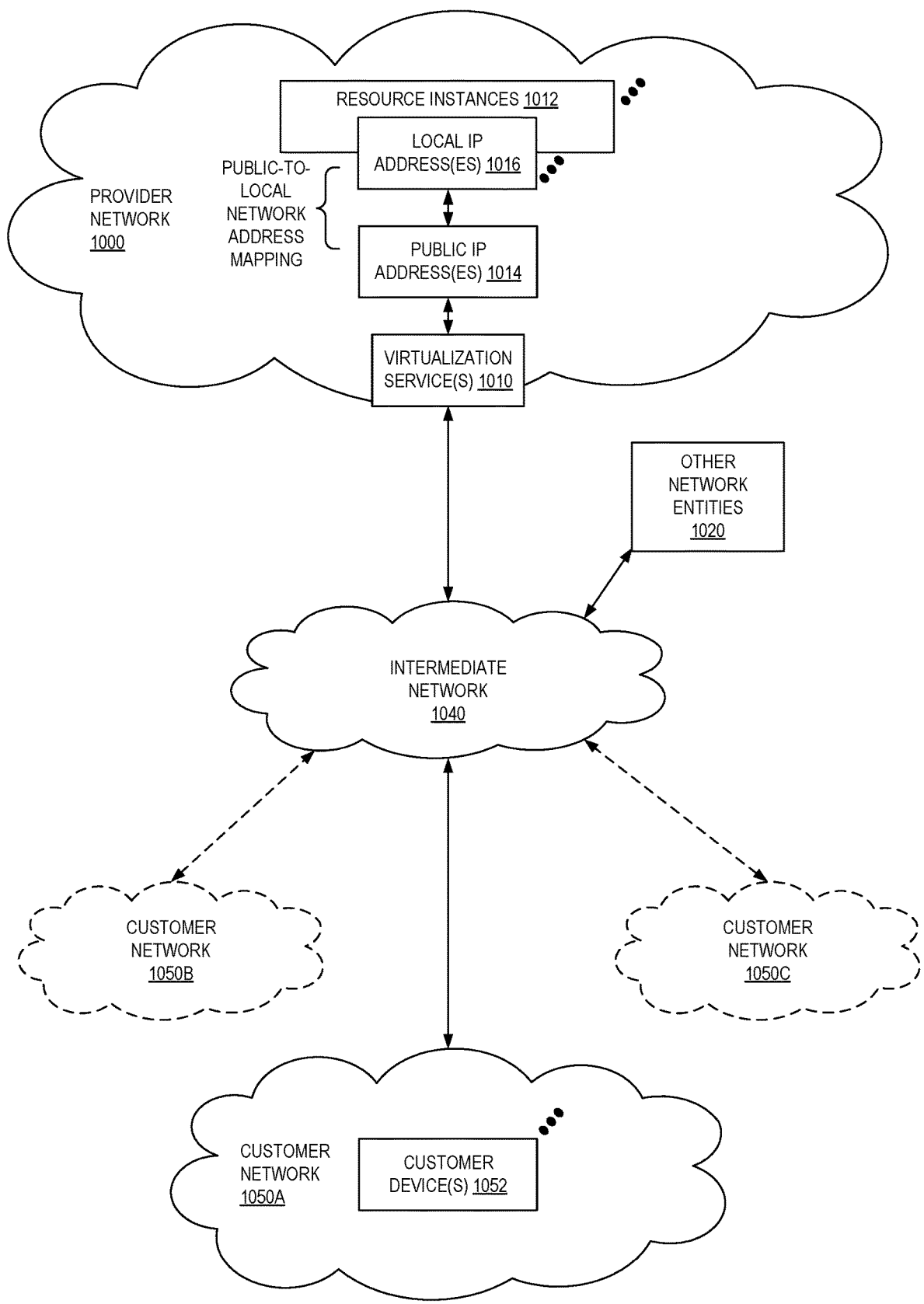
FIG. 10 illustrates an example data center that implements an overlay network on a network substrate using IP tunneling technology according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
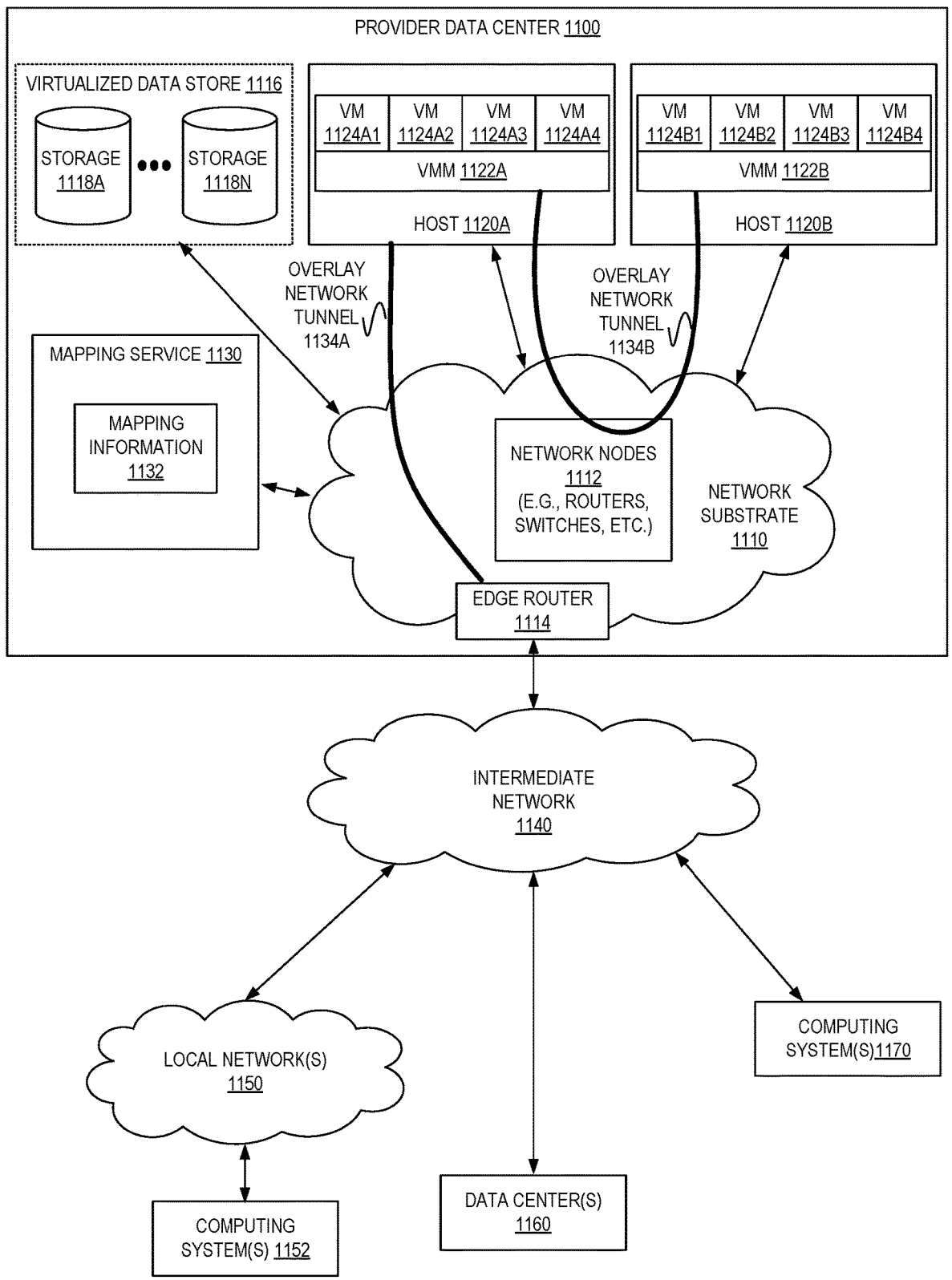
FIG. 11 is a block diagram of an example provider network that provides a storage service and a hardware virtualization service to customers according to some embodiments.

FIG. 11 illustrates an example data center that implements an overlay network on a network substrate using IP tunneling technology, according to some embodiments. A provider data center 1100 may include a network substrate that includes networking nodes 1112 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1110 using tunnels. The IP tunneling technology may provide a mapping and encapsulating system for creating an overlay network on a network (e.g., a local network in data center 1100 of FIG. 11) and may provide a separate namespace for the overlay layer (the public IP addresses) and the network substrate 1110 layer (the local IP addresses). Packets in the overlay layer may be checked against a mapping directory (e.g., provided by mapping service 1130) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1130) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 11, an example overlay network tunnel 1134A from a virtual machine (VM) 1124A (of VMs 1124A1-1124A4, via VMM 1122A) on host 1120A to a device on the intermediate network 1150 and an example overlay network tunnel 1134B between a VM 1124A (of VMs 1124A1-1124A4, via VMM 1122A) on host 1120A and a VM 1124B (of VMs 1124B1-1124B4, via VMM 1122B) on host 1120B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 11, at least some networks in which embodiments may be implemented may include hardware virtualization technology that enables multiple operating systems to run concurrently on a host computer (e.g., hosts 1120A and 1120B of FIG. 11), i.e. as virtual machines (VMs) 1124 on the hosts 1120. The VMs 1124 may, for example, be executed in slots on the hosts 1120 that are rented or leased to customers of a network provider. A hypervisor, or virtual machine monitor (VMM) 1122, on a host 1120 presents the VMs 1124 on the host with a virtual platform and monitors the execution of the VMs 1124. Each VM 1124 may be provided with one or more local IP addresses; the VMM 1122 on a host 1120 may be aware of the local IP addresses of the VMs 1124 on the host. A mapping service 1130 may be aware of (e.g., via stored mapping information 1132) network IP prefixes and IP addresses of routers or other devices serving IP addresses on the local network. This includes the IP addresses of the VMMs 1122 serving multiple VMs 1124. The mapping service 1130 may be centralized, for example on a server system, or alternatively may be distributed among two or more server systems or other devices on the network. A network may, for example, use the mapping service technology and IP tunneling technology to, for example, route data packets between VMs 1124 on different hosts 1120 within the data center 1100 network; note that an interior gateway protocol (IGP) may be used to exchange routing information within such a local network.

In addition, a network such as the provider data center 1100 network (which is sometimes referred to as an autonomous system (AS)) may use the mapping service technology, IP tunneling technology, and routing service technology to route packets from the VMs 1124 to Internet destinations, and from Internet sources to the VMs 1124. Note that an external gateway protocol (EGP) or border gateway protocol (BGP) is typically used for Internet routing between sources and destinations on the Internet. FIG. 11 shows an example provider data center 1100 implementing a network that provides resource virtualization technology and that provides full Internet access via edge router(s) 1114 that connect to Internet transit providers, according to some embodiments. The provider data center 1100 may, for example, provide customers the ability to implement virtual computing systems (VMs 1124) via a hardware virtualization service and the ability to implement virtualized data stores 1116 on storage resources 1118A-1118N via a storage service.

The data center 1100 network may implement IP tunneling technology, mapping service technology, and a routing service technology to route traffic to and from virtualized resources, for example to route packets from the VMs 1124 on hosts 1120 in data center 1100 to Internet destinations, and from Internet sources to the VMs 1124. Internet sources and destinations may, for example, include computing systems 1170 connected to the intermediate network 1140 and computing systems 1152 connected to local networks 1150 that connect to the intermediate network 1140 (e.g., via edge router(s) 1114 that connect the network 1150 to Internet transit providers). The provider data center 1100 network may also route packets between resources in data center 1100, for example from a VM 1124 on a host 1120 in data center 1100 to other VMs 1124 on the same host or on other hosts 1120 in data center 1100.

A service provider that provides data center 1100 may also provide additional data center(s) 1160 that include hardware virtualization technology similar to data center 1100 and that may also be connected to intermediate network 1140. Packets may be forwarded from data center 1100 to other data centers 1160, for example from a VM 1124 on a host 1120 in data center 1100 to another VM on another host in another, similar data center 1160, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1118A-1118N, as virtualized resources to customers of a network provider in a similar manner.

Figure 12:
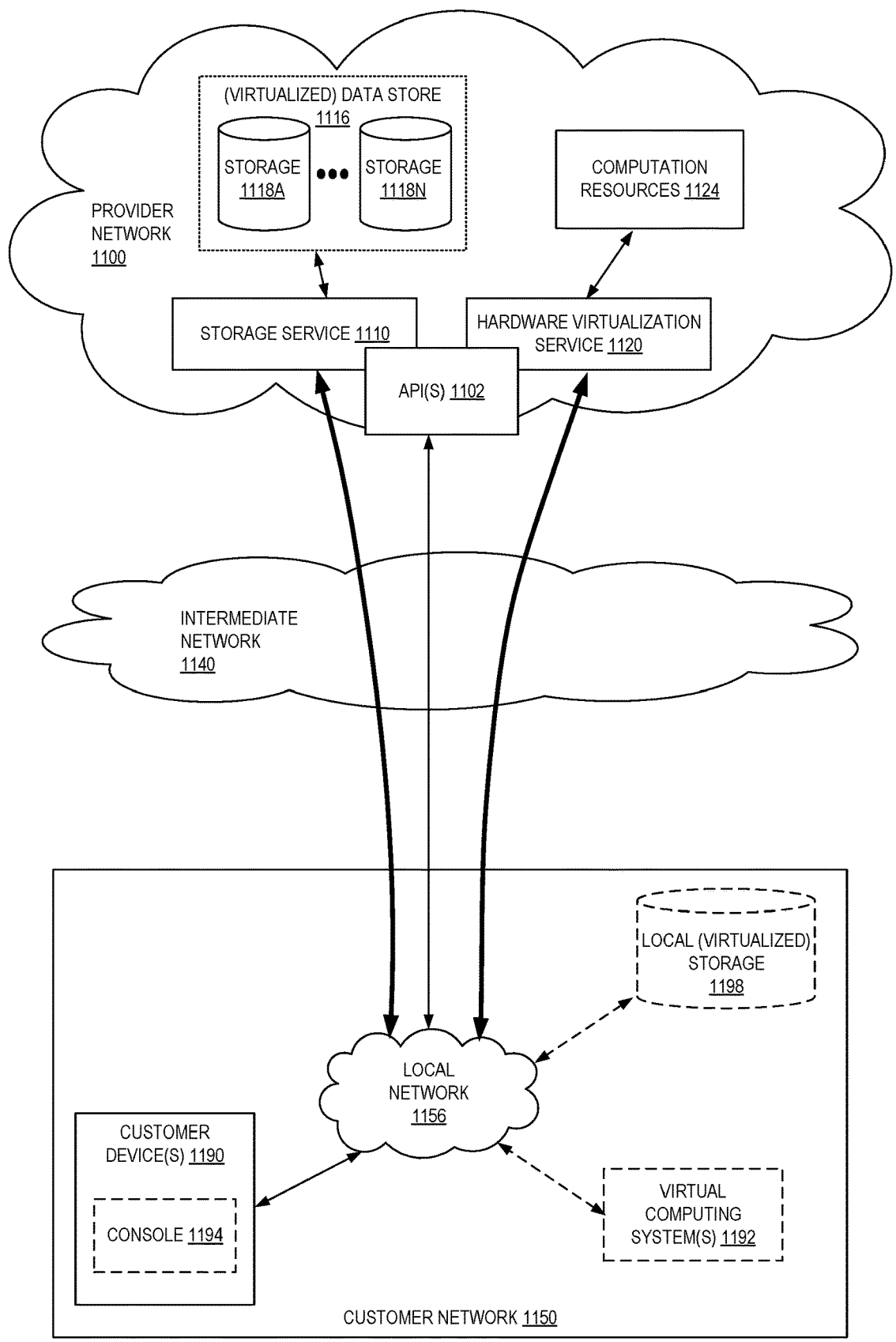
FIG. 12 is a block diagram of an example provider network that provides a storage service and a hardware virtualization service to customers, according to some embodiments.

FIG. 12 is a block diagram of an example provider network that provides a storage service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage service 1210, for example via one or more APIs 1202, to access data from and store data to storage resources 1218A-1218N of a virtual data store 1216 (e.g., a folder or "bucket", a virtualized volume, a database, etc.) provided by the provider network 1200. In some embodiments, a virtualized data store gateway (not shown) may be provided at the customer network 1250 that may locally cache at least some data, for example frequently-accessed or critical data, and that may communicate with storage service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes via storage service 1210 acting as a storage virtualization service, and these volumes may appear to the user as local (virtualized) storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Illustrative System

Figure 13:
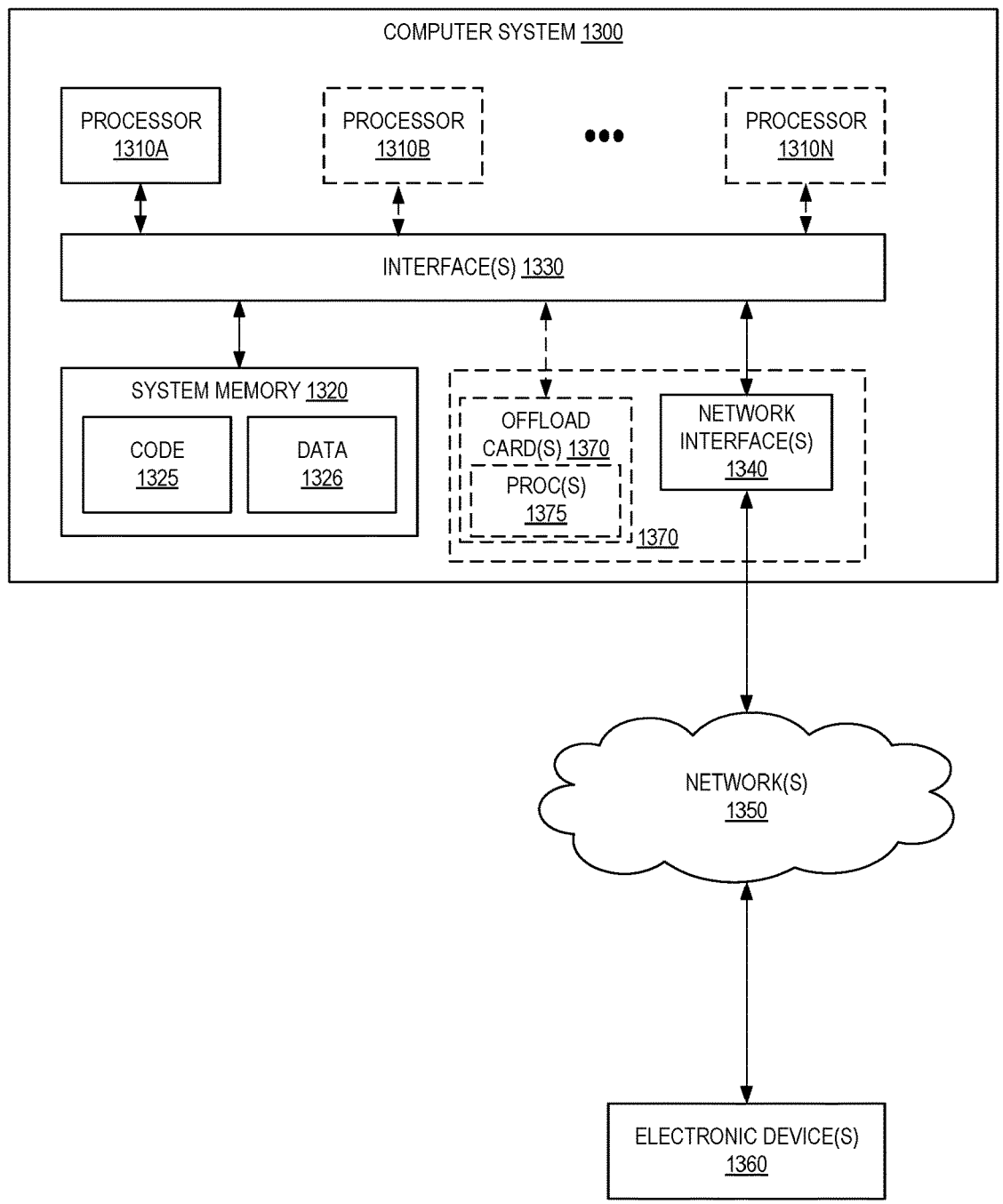
FIG. 13 is a block diagram illustrating an example computer system that may be used in some embodiments.

In some embodiments, a system that implements a portion or all of the techniques for generating conversation training data and training a bot using that data as described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Figure 14:
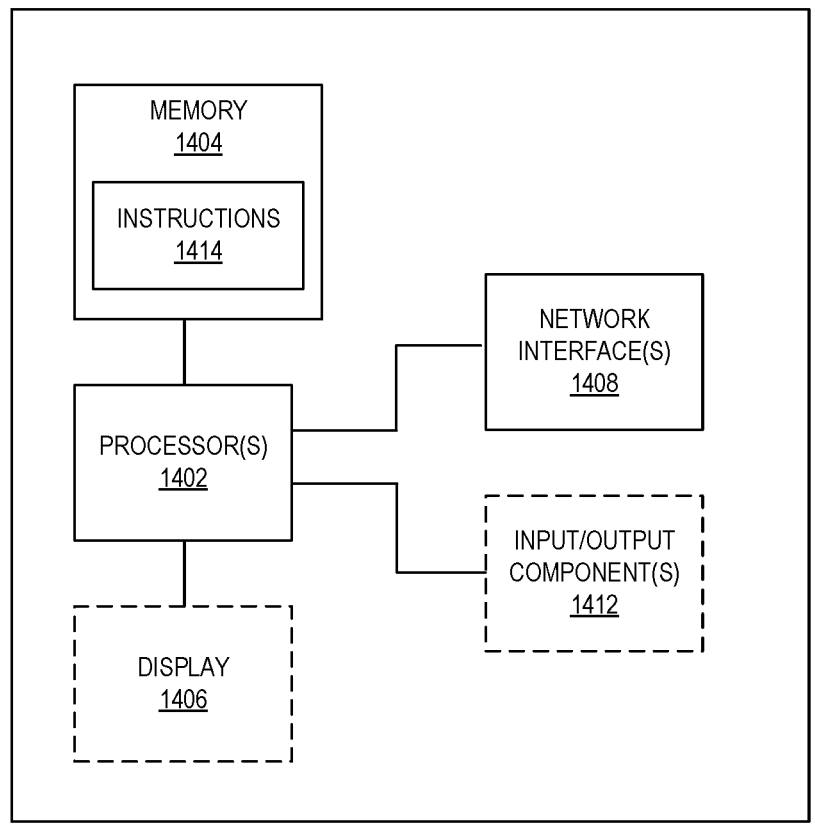
FIG. 14 illustrates a logical arrangement of a set of general components of an exemplary computing device that can be utilized in accordance with various embodiments.

FIG. 14 illustrates a logical arrangement of a set of general components of an example computing device 1400 such as the provider network 211, user device 201, etc. Generally, a computing device 1400 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1402 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1404) to store code (e.g., instructions 1414) and/or data, and a set of one or more wired or wireless network interfaces 1408 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1404) of a given electronic device typically stores code (e.g., instructions 1414) for execution on the set of one or more processors 1402 of that electronic device. One or more parts of various embodiments may be implemented using different combinations of software, firmware, and/or hardware.

A computing device 1400 can include some type of display element 1406, such as a touch screen or liquid crystal display (LCD), although many devices such as portable media players might convey information via other means, such as through audio speakers, and other types of devices such as server end stations may not have a display element 1406 at all. As discussed, some computing devices used in some embodiments include at least one input and/or output component(s) 1412 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 15:
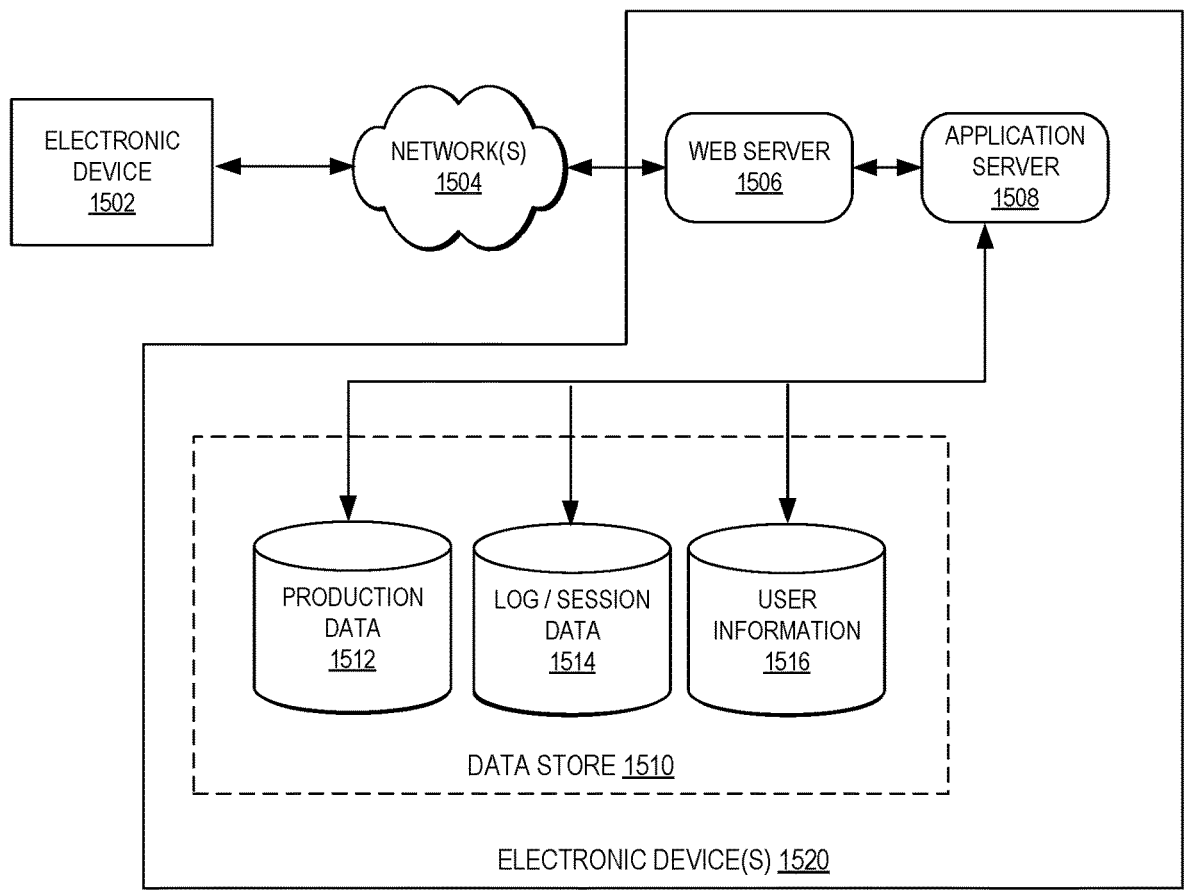
FIG. 15 illustrates an example of an environment for implementing aspects in accordance with various embodiments.

As discussed, different approaches can be implemented in various environments in accordance with the described embodiments. For example, FIG. 15 illustrates an example of an environment 1500 for implementing aspects in accordance with various embodiments. For example, in some embodiments request detailed herein are HyperText Transfer Protocol (HTTP) requests that are received by a web server (e.g., web server 1506), and the users, via electronic devices, may interact with the provider network via a web portal provided via the web server 1506 and application server 1508. As will be appreciated, although a web-based environment is used for purposes of explanation, different environments may be used, as appropriate, to implement various embodiments. The system includes an electronic client device 1502, which may also be referred to as a client device and can be any appropriate device operable to send and receive requests, messages or information over an appropriate network 1504 and convey information back to a user of the device 1502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1504 includes the Internet, as the environment includes a web server 1506 for receiving requests and serving content in response thereto, although for other networks an alternative device serving a similar purpose could be used, as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device 1502 and handling a majority of the data access and business logic for an application. The application server 1508 provides access control services in cooperation with the data store 1510 and is able to generate content such as text, graphics, audio, video, etc., to be transferred to the client device 1502, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1502 and the application server 1508, can be handled by the web server 1506. It should be understood that the web server 1506 and application server 1508 are not required and are merely example components, as structured code discussed herein can be executed on any appropriate device or host machine as discussed elsewhere herein.

The data store 1510 can include several separate data tables, databases, or other data storage mechanisms and media for storing data relating to a particular aspect. For example, the data store illustrated includes mechanisms for storing production data 1512 and user information 1516, which can be used to serve content for the production side. The data store 1510 also is shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. In one example, a user might submit a search request for a certain type of item. In this case, the data store 1510 might access the user information 1516 to verify the identity of the user and can access a production data 1512 to obtain information about items of that type. The information can then be returned to the user, such as in a listing of results on a web page that the user is able to view via a browser on the user device 1502. Information for a particular item of interest can be viewed in a dedicated page or window of the browser.

The web server 1506, application server 1508, and/or data store 1510 may be implemented by one or more electronic devices 1520, which can also be referred to as electronic server devices or server end stations, and may or may not be located in different geographic locations. Each of the one or more electronic devices 1520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the environment 1500 in FIG. 15 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to generate conversational training data for a goal-oriented conversation model and to train a bot machine learning model using the conversational training data;
   traversing a transitional graph of intents to generate a conversation template for each intent of the transitional graph, the conversation template including at least one placeholder for an utterance or a slot level utterance, each intent being a task to fulfill a request, wherein traversing the transitional graph of intents comprises:
  generating paths of a first type, the paths of the first type including nodes of a first type, the nodes of the first type representing decisions;
  iterating through the paths of the first type and replacing the nodes of the first type with nodes of a second type to generate paths of a second type, the nodes of the second type representing possible candidates for the decisions; and
  expanding the paths of the second type to have different permutations for slot order;
for each conversation template, sampling at least utterances from one or more dictionaries to fill in the placeholder for the utterance or slot level utterance to generate the conversational training data; and
training the goal-oriented conversation model using the conversational training data.

2. The computer-implemented method of claim 1, further comprising:
  generating one or more paraphrases for utterances by determining at least one synonymous replacement, evaluating syntactic sense using the paraphrase to determine a perplexity score, and filtering the at least one synonymous replacement when it has a high perplexity score.

3. The computer-implemented method of claim 1, wherein the goal-oriented conversation model uses natural language understanding to interpret user input.

4. A computer-implemented method comprising:
  receiving a request to generate conversational training data for a goal-oriented conversation model;
  traversing a transitional graph of intents to generate a conversation template for each intent of the transitional graph, each intent being a task to fulfill a request and comprising one or more slots to be filled by a user of a bot machine learning model, the conversation template including at least one placeholder for an utterance or a slot level utterance, wherein traversing the transitional graph of intents comprises:
    generating paths of a first type, the paths of the first type including nodes of a first type;
    iterating through the paths of the first type and replacing the nodes of the first type with nodes of a second type to generate paths of a second type; and
    expanding the paths of the second type to have different permutations for slot order;
  sampling at least utterances from one or more dictionaries to fill in the placeholder for the utterance or slot level utterance to generate the conversational training data; and
  storing the conversational training data.

5. The computer-implemented method of claim 4, further comprising:
  generating one or more paraphrases for utterances by determining at least one synonymous replacement, evaluating syntactic sense using the paraphrase to determine a perplexity score, and filtering the at least one synonymous replacement when it has a high perplexity score.

6. The computer-implemented method of claim 4, wherein the goal-oriented conversation model is to utilize natural language understanding to interpret user input.

7. The computer-implemented method of claim 4, further comprising generating the transitional graph of intents from a definition of the bot machine learning model.

8. The computer-implemented method of claim 4, wherein the nodes of the first type represent decisions, and the nodes of the second type represent possible candidates for the decisions.

9. The computer-implemented method of claim 4, wherein traversing the transitional graph of intents further comprises:
  after expanding the paths of the second type, removing redundant states from the paths of the second type to generate the conversation template.

10. The computer-implemented method of claim 4, wherein the utterances from one or more dictionaries are sampled randomly.

11. The computer-implemented method of claim 4, wherein the utterances from one or more dictionaries are sampled using a bias mechanism.

12. The computer-implemented method of claim 4, wherein the traversing the transitional graph of intents is performed in a depth-first manner.

13. The computer-implemented method of claim 4, further comprising:
  training the goal-oriented conversation model using the conversational training data.

14. The computer-implemented method of claim 4, wherein the goal-oriented conversation model is a machine learning model.

15. A system comprising:
  storage to store at least one bot definition; and
  a hosted service implemented by a second one or more electronic devices, the hosted service including instructions that upon execution cause the hosted service to:
  receive a request to generate conversational training data for a goal-oriented conversation model;
  traverse a transitional graph of intents to generate a conversation template for each intent of the transitional graph, each intent being a task to fulfill a request and comprising one or more slot to be filled by a user of the bot machine learning model, the conversation template including at least one placeholder for an utterance or a slot level utterance, wherein traversing the transitional graph of intents comprises:
    generating paths of a first type, the paths of the first type including nodes of a first type;
    iterating through the paths of the first type and replacing the nodes of the first type with nodes of a second type to generate paths of a second type; and
    expanding the paths of the second type to have different permutations for slot order; and
  sample at least utterances from one or more dictionaries to fill in the placeholder for the utterance or slot level utterance to generate the conversational training data, the utterances from the one or more dictionaries including sample utterances from the at least one bot definition.

16. The system of claim 15, wherein the hosted service is further to:
  generate one or more paraphrases for utterances by determining at least one synonymous replacement, evaluating syntactic sense using the paraphrase to determine a perplexity score, and filtering the at least one synonymous replacement when it has a high perplexity score.

17. The system of claim 15, wherein the hosted service is further to:
  generate the transitional graph of intents from a definition of the bot machine learning model.

18. The system of claim 15, wherein the nodes of the first type represent decisions, and the nodes of the second type represent possible candidates for the decisions.

19. The system of claim 15, wherein traversing the transitional graph of intents further comprises:
   after expanding the paths of the second type, removing redundant states from the paths of the second type to generate the conversation template.

20. The system of claim 15, wherein the goal-oriented conversation model is a machine learning model.

* * * * *